United States Patent

Allinikov

[15] 3,698,234

[45] Oct. 17, 1972

[54] PROCESS FOR NONDESTRUCTIVE INSPECTION

[72] Inventor: Sidney Allinikov, Yellow Springs, Ohio

[73] Assignee: The United States of America as represented by the Secretary of the Air Force

[22] Filed: Nov. 18, 1970

[21] Appl. No.: 90,813

[52] U.S. Cl. ........................................ 73/15, 73/150
[51] Int. Cl. .............................................. G01n 25/18
[58] Field of Search ........... 73/432 R, 150, 104, 15.4; 252/408

[56] References Cited

UNITED STATES PATENTS

| | | | |
|---|---|---|---|
| 3,161,038 | 12/1964 | Seltzer et al. | 73/15.4 |
| 3,485,765 | 12/1969 | Gordon | 260/41 C |
| 3,501,410 | 3/1970 | Gordon | 260/41 C |

Primary Examiner—S. Clement Swisher
Attorney—Harry A. Herbert, Jr. and Lloyd E. K. Pohl

[57] ABSTRACT

A substituted 1,3,3-trimethylindolinobenzopyrylospiran is mixed with a nonpigmented, organic-soluble, resin base paint or with an organic-soluble, resin base paint containing a small amount of white pigment and a thin coat of the mixture is applied to the surface of a laminated article. The coating is then activated by ultraviolet light. Activation causes the coating to assume a color. After activation, the coating is heated to a temperature of approximately 125° F. Upon heating, any portion of the coating directly over a weakly bonded or nonbonded portion of the laminated article will return to its original colorless or white state. Any portion of the coating directly over a strongly bonded portion of the laminated article will retain its color. Thus, this invention is useful in that it permits the detection of weakly bonded or nonbonded portions of laminated articles.

8 Claims, No Drawings

PROCESS FOR NONDESTRUCTIVE INSPECTION

BACKGROUND OF THE INVENTION

1. Field of the Invention

This invention relates to compositions of matter which are sensitive both to ultraviolet light and to heat and to methods for using such compositions of matter to inspect laminates to detect any weakly bonded or non-bonded portions.

2. Description of the Prior Art

The use of nondestructive inspection techniques on various structural articles used in industry is well known. For example, steel beams used in the building industry are routinely inspected, prior to incorporation into a building, by ultrasonic or x-ray techniques to insure that they do not have undetected cracks which may later cause them to collapse and break apart. In a like manner, reinforced concrete may be inspected for cracks and flaws by ultrasonic or x-ray techniques. And structural panels used in the construction of aircraft are inspected for flaws both before and subsequent to their incorporation into aircraft.

One type of structural panel commonly used in aircraft is called a laminated structure. Laminated structures are made up of two or more layers of material. In some cases the layers are adhesively bonded together. In other cases they are bonded by heat treating processes. One particular type of laminated structure is called a honeycomb structure. In honeycomb structures, a honeycomb-like layer is sandwiched between two sheet-like layers and bonded to them either by means of an adhesive or by heat treatment. During fabrication, the slightest imperfection or error in the fabricating technique can cause portions of a laminated structure to be weakly bonded together or even remain completely nonbonded. Obviously, it is desirable to discover any weakly bonded or nonbonded areas in a laminated structure before it is used to form part of an airplane. Also, many times when apparently sound laminated structures are used in airplanes, they later develop weaknesses or flaws. Thus, even after an airplane has been constructed it is desirable to periodically test the individual parts thereof to insure that they are still sound. As in the building industry, the aircraft industry has commonly made use of ultrasonic and x-ray techniques to conduct such tests.

Ultrasonic and x-ray nondestructive inspection techniques are complicated, time consuming, and expensive. They require expensive electronic equipment. They require skilled technicians. Often the expensive and delicate equipment must be maneuvered into awkward positions which endanger it. Thus, there has been and will continue to be a demand for simpler, reliable techniques by which nondestructive inspection may be carried out.

SUMMARY OF THE INVENTION

It has now been found that if any one of a group of certain spiropyran dyes is mixed with an organic-soluble resin base paint, which may be either nonpigmented or which may contain a small amount of white pigment, the mixture can be used for nondestructive inspection of laminated articles. The technique of conducting a nondestructive inspection on a laminated article using the paint-dye mixture of this invention involves the steps of:

1. coating the surface of the laminated article with a thin coat of the paint-dye mixture;
2. exposing the coating to ultraviolet light for a time sufficient to change it from a white or colorless coating to a colored one; and
3. heating the colored coating to a temperature of about 125° F. If the laminated article contains poorly bonded or non-bonded areas, the portions of the coating directly above those areas will change back to white or colorless upon heating. On the other hand, any portions of coating directly above areas of the laminated structure which are well bonded will remain colored upon exposure to temperatures of about 125° F.

DESCRIPTION OF THE PREFERRED EMBODIMENT

The dyes used in this invention are from a class commonly called substituted spiropyrans. They may be more aptly defined by the term substituted 1,3,3-trimethylindolinobenzopyrylospirans. They may be represented by the structural formula:

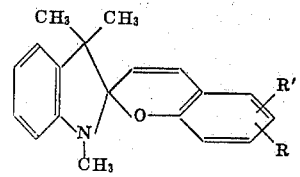

wherein R and R' are selected from the group consisting of H, $NO_2$, Cl, Br, allyl, and alkoxy, said alkoxy group preferably containing from one to about six carbon atoms.

The following example describes the preparation of crystals of the above described dye wherein R is H and R' is 6'-nitro. The other derivatives may be prepared in the same manner by using the proper salicylaldehyde derivative in lieu of the 5-nitrosalicylaldehyde used in the example.

EXAMPLE I

Dye Crystal Preparation

1. Add approximately 100 milliliters of denatured ethyl alcohol to a clean container. Then add 5 grams of 5-nitrosalicylaldehyde and stir with moderate heating to dissolve completely. Heating should, of course, be conducted by a method which does not require the use of an open flame.

2. After the 5-nitrosalicylaldehyde is completely dissolved, bring the solution to a gentle boil and add 5 grams of 1,3,3-trimethyl-2-methyleneindoline.

3. Maintain the entire solution at a gentle boil. Replenish alcohol as necessary. After several minutes crystals of the dye will begin to appear. The reaction is essentially complete within 5 to 10 minutes after the initial appearance of the crystals.

4. When it appears that no more crystals are forming, remove the container from the heat source and filter to retrieve the dye crystals. Filtration may be carried out with coarse fast filter paper, a suction funnel and a flask.

5. After retrieval, wash the dye crystals with cold methyl alcohol to remove impurities.

6. Dry the dye crystals by spreading them on a clean absorbent paper.

The following example describes the preparation of a white pigmented paint base for use with the dye. If a pigment is used in a paint-dye mixture, the amount of pigment used must be considerably smaller than that used for conventional paint applications. A reduction in the amount of pigment is necessary in order to permit the color of ultraviolet activated dye to show up during the later described nondestructive inspection process.

EXAMPLE II

Preparation of Paint Base

1. Add 500 grams of butyl alcohol and 500 grams of denatured ethyl alcohol to a clean container.
2. Warm (do not boil) the solution gently and add 125 grams of polyvinyl butyral resin while stirring vigorously. Dust the resin in slowly in order to insure complete dissolution.
3. After the resin has been added and dissolved, pour the mixture into a pebble mill. Then add 25 grams of pigment grade titanium dioxide and mill the paint base for approximately 10 hours.
4. After milling, collect as much paint from the mill as possible and then add a mixture of 100 grams of ethyl alcohol and 100 grams of butyl alcohol to the mill as a wash and run the mill briefly.
5. Finally, add the wash to the previously collected paint.

The foregoing example specifies the addition of 25 grams of pigment per 125 grams of resin. This ratio may be deviated from somewhat. For example, as much as 30 grams of pigment per 125 grams of resin will still provide good results. On the other hand, the pigment may be completely eliminated. Thus, in practicing this invention one may utilize from 0 to about 30 grams of titanium dioxide pigment per 125 grams of polyvinyl butyral resin in an organic solvent. The amount of organic solvent used may, of course, be varied also. For example, the final wash (100 grams of ethyl alcohol plus 100 grams of butyl alcohol) may be discarded and not added to the originally prepared paint. Thus, the paint prepared in the foregoing example may contain about 500 to 600 grams of butyl alcohol and about 500 to 600 grams of ethyl alcohol and from 0 to 30 grams of titanium dioxide per 125 grams of polyvinyl butyral resin. One resin which may be used is sold under the trademark Butvar by the Shawinigan Resins Corporation. Butvar polyvinyl butyral resins have an average molecular weight in the range of from 32,000 to 225,000.

After the paint base and the dye crystals have been prepared, they are mixed. The following example describes the procedure for mixing them.

EXAMPLE III

Mixture of Paint and Dye

1. While vigorously stirring the above-described paint base in a clean container, slowly add to the total quantity thereof from about 5 to about 7 grams of the above-described dye crystals.
2. Continue to stir the mixture for at least one-half hour. The previously white or clear paint base will assume a slight color as the dye dissolves. The color assumed will depend upon which derivative of salicylaldehyde was used in the preparation of the dye crystals.
3. After about one-half hour of stirring, the paint-dye mixture is ready for use. It may be applied to a surface by any of the methods usually employed to apply paint. For example, it may be sprayed, brushed, or rolled on to a surface. After application to a surface, it dries in from about 1 to about 10 hours depending on the temperature and humidity of the ambient air.

The following examples describe processes by which the above-described paint-dye mixture may be used to determine the soundness of laminated structures.

EXAMPLE IV

1. A thin coat of the above-described paint-dye mixture, wherein the paint contained 25 grams of titanium dioxide per 125 grams of polyvinyl butyral resin, was brushed on to a laminated structure of the type commonly used to fabricate radomes in military aircraft. The paint-dye mixture was then allowed to dry. The laminated structure contained a honeycomb-type layer of thermosetting polymeric material sandwiched between and adhesively sealed to two sheet-like layers of thermosetting polymeric material. The laminated structure was deliberately fabricated so as to contain weakly bonded areas, nonbonded areas, and strongly bonded areas. 2. After drying, the paint-dye coating was exposed to ultraviolet radiation in the 3,660 A wavelength band for several seconds. During this exposure, the previously white coating assumed a purple color. (The color assumed depends upon the dye used as will be more fully described later.)
3. After exposure to ultraviolet light, the colored coating was heated to a temperature of approximately 125° F with a hot air gun. Upon heating, those portions of the coating which covered areas of the layered structure which were weakly bonded or nonbonded turned back to the original white color. On the other hand, where the underlying laminated structure was strongly bonded, the coating retained its purple color.
4. After heating, the coating was allowed to cool in normal light. After about two hours the entire coating reassumed its original white color.
5. After the coating had returned to its original white color, it was re-exposed to ultraviolet light and once again assumed a purple color.
6. Step (3) was repeated with like results. In practice, the steps of coloring by ultraviolet light exposure, testing for flaws in the underlying laminated structure by heating, and allowing the coating to reassume its original white or colorless state can be repeated many times. After about 20 to about 50 repetitions, the coating will begin to lose its ability to assume color upon exposure to ultraviolet light.

EXAMPLE V

A laminated structure prepared by sandwiching a sheet of thermosetting polymeric material between two sheets of aluminum was coated with the above-described paint-dye mixture. As in the previous example, the coating was exposed to ultraviolet light for a few seconds and then heated with a hot air gun. As in EXAMPLE IV, portions of the coating directly over underlying weakly bonded or nonbonded areas of the laminate turned white while the remainder of the coating remained purple.

EXAMPLE VI

Many other laminated structures containing up to five layers of various materials were tested using the above process. In all cases similar results were obtained. It is believed that the results are obtained because: (1) where the underlying laminated structure is strongly bonded heat applied to the surface is quickly conducted away from the surface and dissipated and (2) where weakly bonded or nonbonded areas underlie the coating dissipation of the heat is hindered. That is, heat cannot be quickly conducted away from the surface through poor bonds. Thus, heat builds up at the surface directly above poor bonds and causes the dye to fade.

EXAMPLE VII

The paint-dye mixtures of this invention may also be utilized to detect foreign material such as water drops or excesses of adhesive trapped between layers of laminated structures. When a foreign material is trapped between layers, the portion of the coating directly above it will become more deeply colored upon heating.

Many substituted spiropyrans may be used in the practice of this invention. The color which the dye assumes upon exposure to ultraviolet light varies with the R and R' groups. The following table enumerates the colors obtained with certain specifically located R and R' groups.

TABLE

| R | R' | Color |
| --- | --- | --- |
| H | 6'-nitro | purple |
| H | 7'-nitro | orange |
| H | 7'-chloro | purple |
| 6'-bromo | 8'-bromo | blue |
| 6'-nitro | 8'-allyl | purple |
| 6'-nitro | 8'-bromo | purple |
| 6'-chloro | 8'-nitro | purple |
| 6'-bromo | 8'-nitro | purple |
| 6'-nitro | 8'-methoxy | dark blue |
| 6'-methoxy | 8'-nitro | green |
| 5'-nitro | 8'-methoxy | dark green |

While polyvinyl butyral resin is utilized in preparing the above-described paint base, it is to be understood that many other organic soluble resins commonly used in paint formulations can be used in lieu thereof. Examples of useful resins include polyvinyl acetate, polyvinylpyrrolidone, polymers of methyl methacrylate and many others. Also, a mixture of butyl and ethyl alcohol was used as the organic solvent in preparing the paint base. However, the alcohols of the specific example may be replaced by other organic materials, including, for example, aromatic hydrocarbons, such as benzene, toluene, and xylenes, ketones, such as acetone and methyl ethyl ketone, and chlorinated hydrocarbons such as trichloroethylene. It is preferred, however, that the solvent be an organic solvent and not an inorganic solvent such as water. When the above-described coatings are dried, a certain amount of the solvent remains entrapped in the coating. The dye remains associated with this residual solvent and it has been found that the dyes utilized in this invention produce much better results when associated with organic solvents than they do when associated with inorganic solvents.

The coating applied in the above examples is described as being "thin." It has been found that coatings having thicknesses of between about 0.003 inch and about 0.01 inch give the best results.

In the above examples it is indicated that the coat is subjected to ultraviolet light for several seconds and then to a temperature of approximately 125° F. The times and temperatures used may, in actuality, vary to a considerable degree. A brief period of from approximately 1 to 10 seconds under ultraviolet light is sufficient to impart color to the dyes used in the process of this invention. The temperature obtained from a heat gun also varies to a great degree. A temperature of about 125° F is one which a surface may reach in a few seconds if a conventional heat gun is held from about 1 to about 2 inches away from the surface. It is merely an approximate temperature. In practice, the temperature which the surface is actually heated to may vary from about 100° F to about 150° F.

Thus far, the paint-dye mixture of this invention has been described as being applied as a coating to the laminate to be tested. If, for some reason, it is undesirable to apply the mixture as a coating, certain other techniques may be utilized. For example, one side of a tape may be painted with the paint-dye mixture and the other side of the tape adhesively attached to the surface of the laminated article. This technique yields results which parallel those of the above-described painting method if the adhesion formed between the tape and the surface of the laminated article is good. Also, one may coat one side of a thin sheet of plastic material with the paint-dye mixture and then press the other side tightly down on the surface of the laminated article to be tested and obtain good nondestructive inspection test results. If this last operation is carried out, it may be desirable to place the test specimen in an evacuated box provided with means whereby objects therein may be manipulated as with a glove or pair of gloves protruding into the box. By utilizing an evacuated system, one may insure an extremely tight adherence between the paint-dye coated plastic sheet and the laminated article to be tested. A sheet or film of polyvinyl chloride is an example of one particular material which may be coated and applied to a test specimen in the manner just described and which will yield excellent results.

I claim:

1. A process for the nondestructive inspection of laminated articles which comprises:
   a. applying to the surface of a laminated article a coating of a base paint-dye mixture, said base paint comprising a resin dissolved in an organic solvent and from 0 to about 30 grams of white pigment per 125 grams of resin and said dye being represented by the formula:

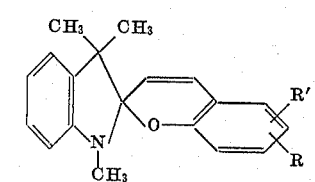

wherein R and R' are selected from the group consisting of H, $NO_2$, Cl, Br, allyl, and alkoxy;
  b. exposing the applied coating to ultraviolet light, thereby causing it to assume a color; and
  c. heating the applied coating.

2. A process according to claim 1 wherein said base paint is formulated from about 500 to about 600 grams of butyl alcohol and from about 500 to about 600 grams of ethyl alcohol per about 125 grams of polyvinyl butyral resin.

3. A process according to claim 1 wherein the applied coating has a thickness of from 0.003 inch to about 0.01 inch.

4. A process according to claim 1 wherein said laminated article is a honeycomb type structure made up of a honeycomb-like layer sandwiched between and bonded to two sheet-like layers.

5. A process according to claim 1 wherein said laminated article is made up of a plurality of sheet-like layers bonded together.

6. A process according to claim 1 wherein said coating is applied by painting one side of a tape with said base paint-dye mixture and then adhesively attaching the other side of said tape to said laminated article.

7. A process according to claim 1 wherein said coating is applied by painting one side of a thin sheet of plastic material and then tightly pressing the other side of said sheet down upon said laminated article.

8. A process according to claim 7 wherein said painted sheet of plastic material is pressed down upon said laminated article while said sheet and said laminated article are under a vacuum.

* * * * *